A. S. POOLE.
LOOM ATTACHMENT.
APPLICATION FILED MAR. 11, 1918.
1,314,149.
Patented Aug. 26, 1919.
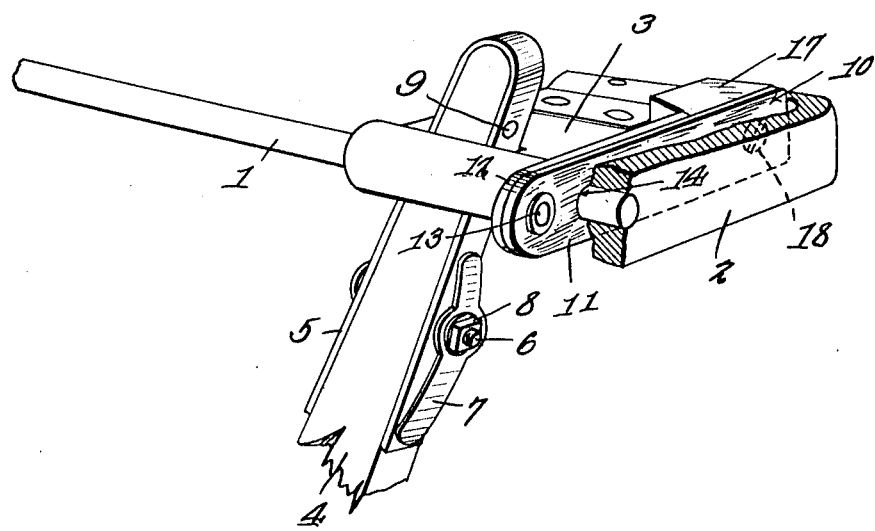
A. S. Poole, Inventor,
Witness
By C. A. Snow & Co.,
Attorneys.

UNITED STATES PATENT OFFICE.

ALFONSO S. POOLE, OF DANVILLE, VIRGINIA.

LOOM ATTACHMENT.

1,314,149. Specification of Letters Patent. Patented Aug. 26, 1919.

Application filed March 11, 1918. Serial No. 221,795.

*To all whom it may concern:*

Be it known that I, ALFONSO S. POOLE, a citizen of the United States, residing at Danville, in the county of Pittsylvania and State of Virginia, have invented a new and useful Loom Attachment, of which the following is a specification.

This invention relates to improvements in looms, one of its objects being to prolong the life of the picker stick and of the picker and picker stop. The frictional engagement between the picker stick and the picker results in the quick formation of deep recesses in the front and back faces of the picker stick which renders them unfit for use and necessitates the substitution of a new picker stick. Furthermore the wearing of the recesses in the picker stick and the resultant rough surfaces, rapidly wears out the raw hide picker.

It is an object of the present invention to eliminate the objectionable features above enumerated and to provide means whereby the life of the picker stick, the picker and the picker stop can be greatly prolonged, direct contact between the wood of the picker stick and the picker being eliminated.

With the foregoing and other objects in view which will appear as the description proceeds, the invention consists of certain novel details of construction and combinations of parts which will be hereinafter more fully described and pointed out in the claim, it being understood that various changes may be made within the scope of the appended claim without departing from the spirit of the invention.

In the accompanying drawing, which is a perspective view of the improvements constituting the invention, the preferred form of the device has been shown.

Referring to the figures by characters of reference, 1 designates the ordinary picker rod or spindle one end of which is secured within a housing a portion of which has been illustrated at 2. The picker 3 is of the ordinary reversible type formed of raw hide and mounted to reciprocate on the rod 1. A picker stop 17 has been indicated generally at 17. The ordinary picker stick 4 is provided and projects through an opening in the picker. To prolong the life of the picker stick and of the picker, a metal wear strip 5 straddles the end of the picker stick and extends along the front and back faces thereof for short distances so as to extend through and frictionally engage the picker. A bolt 6 is extended through the picker stick below the picker and through the end portions of the reinforcing strip 5, and the threaded end of the bolt extends loosely through a spring plate 7 and engages an adjusting nut 8. The spring plate 7 exerts a constant pull upon the bolt and pressure upon one member of the strip 5 so that said strip is constantly pressed firmly against the picker stick to prevent play between the parts which might result from packing of the fibers of the wooden picker stick. The upper portion of the strip 5 can be fastened to the stick by a rivet 9 located above the picker.

It will be noted that the plate 7 has a short arm and a long arm. Thus the plate can be held in place by a bolt 6 extending through the picker stick at the usual place. The short arm, however, will press the wear strip 5 against the wood of the picker stick at a point close to the picker, where the greatest compression of the wood results from the pounding to which the picker stick is subjected. The long arm of the plate 7 presses the lower end portion of the strip 5 against the picker stick, thereby preventing the vibration or movement that would otherwise result from the pounding of the parts.

What is claimed is:—

In a loom the combination with a picker, of a picker stick projecting therethrough, wear members upon opposed faces of the picker stick and extending through the picker to engage the same, a bolt extending through the picker stick below the picker and through the opposed wear members and having its head bearing against the outer face of one of the wear members, an elongated spring plate loosely engaged by the bolt and bearing at its ends against the outer surface of the other wear member, said spring plate having a short arm extending toward the picker and a long arm extending close to the end of the wear member engaged by said arm, and means adjustably engaging the bolt for regulating the tension of the spring plate to compress the picker stick between the wear members and take up wear upon the stick.

In testimony that I claim the foregoing as my own, I have hereto affixed my signature in the presence of two witnesses.

ALFONSO S. POOLE.

Witnesses:
LOUIS LEFKOVITZ,
CLEVE BRANDEN.